No. 781,239. Patented January 31, 1905.

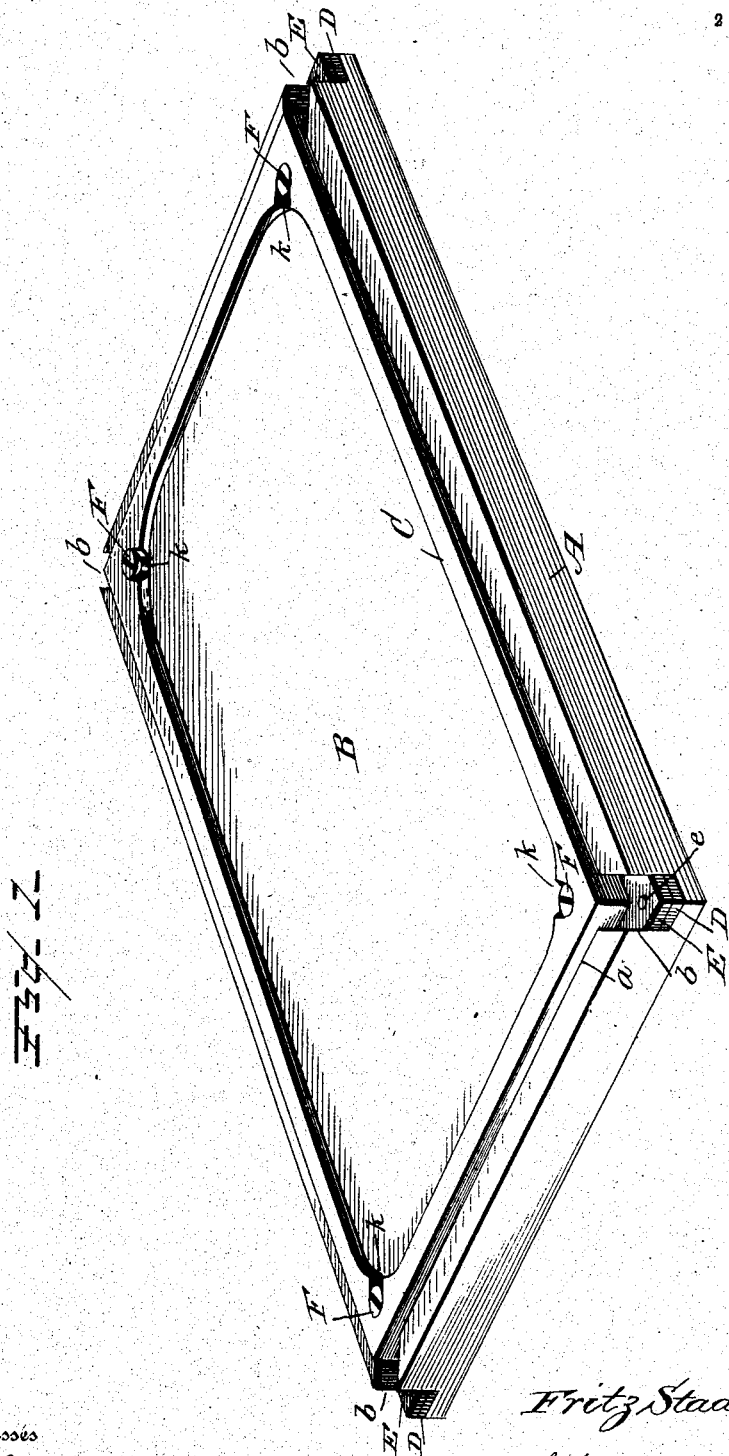

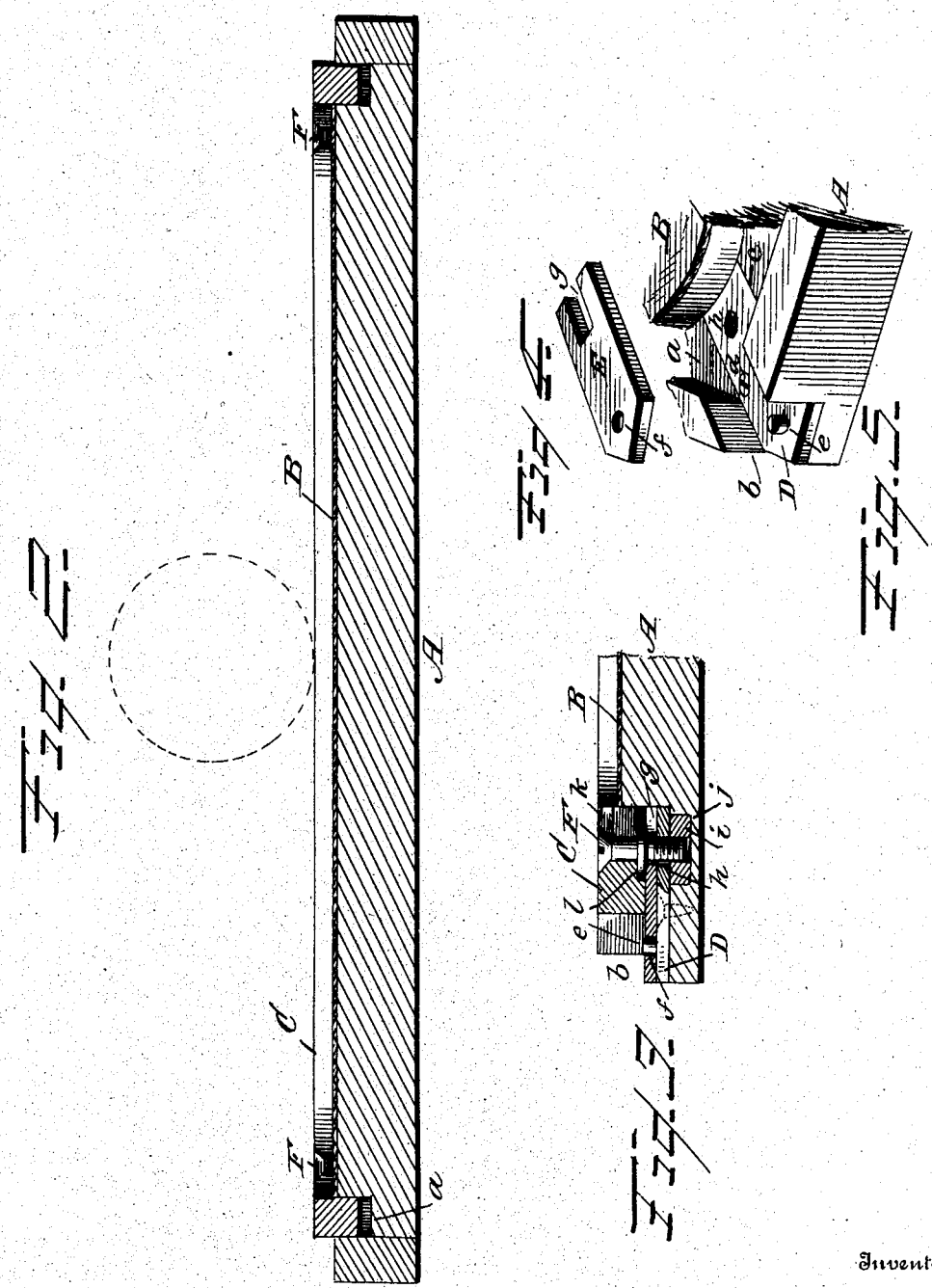

UNITED STATES PATENT OFFICE.

FRITZ STAASSEN, OF MONMOUTH, ILLINOIS.

PASTRY-BOARD.

SPECIFICATION forming part of Letters Patent No. 781,239, dated January 31, 1905.

Application filed November 10, 1904. Serial No. 232,071.

*To all whom it may concern:*

Be it known that I, FRITZ STAASSEN, a citizen of the United States, residing at Monmouth, in the county of Warren and State of Illinois, have invented certain new and useful Improvements in Pastry-Boards; and I do hereby declare that the following is a full, clear, and exact description of the same, reference being had to the annexed drawings, making a part of this specification, and to the letters of reference marked thereon.

The present invention has for its object to provide a pastry-board that can be easily operated to roll dough to a uniform thickness for making cookies, cakes of all kinds, pie-pastry, and for other purposes where it is essential that the dough be rolled into sheets of even and of any desired thickness as found desirable; and it consists in a pastry-board constructed substantially as shown in the drawings and hereinafter described and claimed.

Figure 1 of the drawings is a perspective view of a pastry-board constructed in accordance with my invention; Fig. 2, a longitudinal vertical section showing the rolling-pin in dotted lines; Fig. 3, a detail sectional view of one corner of the pastry-board, showing the means for connecting the supporting-bed upon which the dough to be rolled is placed and the frame together. Fig. 4 is a perspective view of one of the supporting-plates to regulate the height of the frame; Fig. 5, a perspective view of one corner of the supporting-bed, showing the supporting-plate in position thereon.

In the accompanying drawings, A represents the supporting-bed to receive the dough previous to its being rolled to the required thickness, said bed being of any suitable size and shape and constructed of wood or any other preferred material found best adapted to the purpose and is provided upon its upper surface with a fibrous covering B, of canvas or like material, which can be removed therefrom and replaced by a new one when the covering becomes worn or useless. This covering is considered of material importance in view of the fact that it prevents the dough from sticking and forms a yielding surface upon which to roll the dough.

The supporting-bed A has a groove around its four sides, as shown at $a$, as shown more clearly in Fig. 2 of the drawings, and in this groove loosely fits the adjustable frame C, which is preferably of metal and is adapted to be raised or lowered in accordance with the thickness of dough desired. The corners of the supporting-bed A and at the apex formed by the sides of the bed are cut away, so as to form open spaces $b$, and on a line with the open spaces are mortises $c$ to receive stationary supporting-plates D, so that said plates will be flush with the surface of the groove $a$. The supporting-plate D forms a support for similar plates E, and any number of these plates may be used at each corner of the supporting-bed so as to regulate the height of the frame C with relation to the supporting-bed A, the adjustment of the height depending upon the thickness of the sheet of dough required. The stationary plate D is secured in place in the mortise $c$ by means of screws $d$ or other like fastenings, as shown in Fig. 5 of the drawings, and said plate at its outer end has a dowel-pin $e$, which may be of any height to receive plates E of varying thickness or any number of plates of equal thickness. Each of the plates E has a perforation $f$ to engage the dowel-pin $e$, and its inner end is bifurcated, as shown at $g$, and when said plate is in place over the plate D the bifurcation will register with a bolt-hole $h$ in the stationary plate.

Under each of the supporting-plates D and on line with the bolt-hole $h$ is a stationary screw-nut $i$, which is seated in a mortise $j$ in the supporting-bed, as shown in Fig. 3 of the drawings, and engaging with the nut is a screw-bolt F. The screw-bolt F extends down through an open slot $k$ in the corner of the frame C, as shown in Fig. 1 of the drawings, and through the bolt-hole $h$ in the plate D and the screw-threaded end of the bolt engages the threads in the nut $i$. The screw-bolt F has a washer $l$ rigidly secured thereto and which moves with said bolt, which is held permanently to the frame C by virtue of said washer, and by turning the screw-bolt in the proper direction the height of the frame may be adjusted, and by turning the bolt so as to disengage it with the nut $i$ the frame may be removed. The open slots $k$ admit of the bolts being removed from the frame C when desired, the open slots being necessary in view of the fact that the washer is a permanent fixture to the bolt, and consequently could not be withdrawn through an ordinary bolt-hole, and the bifurcations in the plates E admit of the plates being placed in position without the necessity of removing the frame with the screw-bolts.

In describing the several details of construction it is evident that many changes or modifications of the invention can be made without in any manner departing from the essential features thereof, and I wish it so understood that any changes that would come within ordinary mechanical judgment may be resorted to.

Having now fully described my invention, what I claim as new, and desire to secure by Letters Patent, is—

1. A pastry-board comprising a suitable supporting-base having a fibrous covering upon its face and grooves upon the four sides of the base and a frame engaging the grooves and means for adjusting the height of the frame with relation of the face of the base, substantially as and for the purpose described.

2. A pastry-board comprising a supporting-base with grooves upon its four sides, open spaces at the corners of the base, supporting-plates located therein and permanently secured to the base, said plates having dowel-pins and bolt-holes and stationary screw-nuts upon the under side on the plates and on line with the bolt-holes, bifurcated supporting-plates engaging the dowel-pins, and a frame engaging the grooves in the supporting-base and having open slots at the corners thereof, and bolts extending through the slots and having stationary washers, said bolts extending through the bifurcations of the plates and engaging the screw-nuts, substantially as and for the purpose specified.

In testimony whereof I affix my signature in presence of two witnesses.

FRITZ STAASSEN.

Witnesses:
R. H. McLuskey,
W. S. Findley.